US009222634B2

(12) United States Patent
Zhu

(10) Patent No.: US 9,222,634 B2
(45) Date of Patent: Dec. 29, 2015

(54) SOLAR LIGHTING APPARATUS AND SYSTEM THEREOF

(75) Inventor: Shou Qiang Zhu, Central (HK)

(73) Assignee: IP Powers Holdings Limited, Hong Kong (HK)

( * ) Notice: Subject to any disclaimer, the term of this patent is extended or adjusted under 35 U.S.C. 154(b) by 457 days.

(21) Appl. No.: 13/573,399

(22) Filed: Sep. 12, 2012

(65) Prior Publication Data

US 2014/0070708 A1    Mar. 13, 2014

(51) Int. Cl.
| | | |
|---|---|---|
| *F21S 9/03* | (2006.01) | |
| *F21V 21/08* | (2006.01) | |
| *F21S 2/00* | (2006.01) | |
| *F21S 6/00* | (2006.01) | |
| *F21V 21/06* | (2006.01) | |
| *F21W 131/10* | (2006.01) | |
| *F21W 131/109* | (2006.01) | |
| *F21Y 101/02* | (2006.01) | |

(52) U.S. Cl.
CPC ............... *F21S 9/035* (2013.01); *F21S 9/032* (2013.01); *F21V 21/0824* (2013.01); *F21S 2/00* (2013.01); *F21S 6/005* (2013.01); *F21V 21/06* (2013.01); *F21W 2131/10* (2013.01); *F21W 2131/109* (2013.01); *F21Y 2101/02* (2013.01); *Y02B 10/10* (2013.01)

(58) Field of Classification Search
CPC ........... F21S 9/035; F21S 9/032; F21S 6/005; F21S 2/00; F21S 9/03; F21V 21/0824; F21V 21/06; Y02B 10/10; F21W 2131/10; F21W 2131/109; F21W 2131/103; F21Y 2101/02
See application file for complete search history.

(56) References Cited

U.S. PATENT DOCUMENTS

| | | | | |
|---|---|---|---|---|
| 4,793,111 | A * | 12/1988 | Shewchuk | 52/298 |
| 5,954,426 | A * | 9/1999 | Whittington | 362/414 |
| 6,802,630 | B2 * | 10/2004 | Doppelt | 362/414 |
| 7,490,964 | B2 * | 2/2009 | Haddad et al. | 362/431 |
| 8,601,750 | B1 * | 12/2013 | Zhu | 52/155 |
| 2009/0090895 | A1 * | 4/2009 | Hogan, Jr. | 254/266 |

* cited by examiner

*Primary Examiner* — Jung Kim
(74) *Attorney, Agent, or Firm* — Che-Yang Chen; Law Office of Michael Chen

(57) ABSTRACT

A solar lighting apparatus and system, which is constructed into a street lamp, entrance lamp, garden lamp, nightlight, etc., includes a light emitting unit for providing illumination and a lighting apparatus body; a solar energy arrangement including a solar panel unit for light absorption and power supply; and a mounting plate; at least one ground supporting unit coupling with the mounting plate for securing the mounting plate onto a ground surface; and a light apparatus connecting unit provided through the mounting plate for firmly positioning the lighting apparatus, and a LED light control arrangement effectively controlling a power consumption in such a manner that the light emitting unit is arranged to being charged and discharged in a controlled manner and is protected against short circuit and overcharging, thereby maximizing power utilization, increasing lifespan and performance of the solar lighting apparatus.

13 Claims, 16 Drawing Sheets

SOLAR LIGHTING APPARATUS AND SYSTEM THEREOF

BACKGROUND OF THE PRESENT INVENTION

1. Field of Invention

The present invention relates to, and more particularly to a solar lighting apparatus, and more particularly to a solar light apparatus which includes a wiring arrangement and a power control mechanism such that the solar light apparatus can provide an adjustable solar panel having a size independent to and unrestricted by the size of the light apparatus and therefore can provide higher power which is suitable for different uses such as a street lamp, a pathway light, an entrance light, an outdoor lamp while at the same has a control mechanism to effectively utilize the solar energy to fit the day-night cycle of a day and to prepare for providing illumination during non-sunny days.

2. Description of Related Arts

Energy crisis is an important issue for today's world and has led to recent development in relation to green energy and energy conservation method, both in industrial and household level. In particular, active exploitation of solar energy is one of the important developments which include expanding the possibility of utilization in different areas and developing more effective way of utilization. In the past, the cost of making solar energy available for use was at a very high level and the effectiveness of utilization is not satisfactory. Therefore, it is not cost-effective to explode the use of solar energy for household products which require a low energy requirement, even though the accumulated sum of energy requirement is substantively high.

Recently, utilization of solar energy at household level has been developed and becomes more acceptable to the public when the cost of utilization is lowered and the effective of utilization is improved, due to the lower cost of equipment and/or subsidies provided by local governments or authorities. For example, installation of solar panel on a roof of a house for providing electricity to the house is one of the important developments of utilization of solar energy. However, the installation and equipment cost is still very high.

Lighting apparatus is widely used in different areas, such as indoor building structures which include industrial buildings, office buildings or household buildings, and outdoor lighting tools which include lamp poles in the streets, pathway light and entry light for a building structure. If it is possible to replace all these lighting apparatus into solar lighting apparatus, the utilization of solar energy will be greatly increased and therefore the effect of energy conservation is substantively high.

One of the recent developments in relation to utilization of solar energy is seen in garden pathway light apparatus. In general, the pathway light apparatus has a very low power requirement and includes a solar panel affixed on its top surface to obtain solar energy as its power source. Accordingly, the pathway light apparatus can obtain and store solar energy during the daytime and utilize the solar energy to provide illumination during the nighttime. However, this early development and exploitation of solar energy is not effective and has the following drawback. First, this is only suitable for low power pathway light apparatus because the solar panel positioned at the top surface is limited by the size of the light apparatus and the power of the light apparatus is limited by the size of the solar panel. In other words, this utilization is limited to low powered pathway light apparatus. In general, the pathway light apparatus may not be able to provide illumination for the whole night. Second, the position of the solar panel is fixed relative to the light apparatus and therefore the solar panel fails to adapt to any changes of solar light direction. In other words, when the light apparatus is positioned at different locations which face different cardinal points, the ability to obtain solar energy will be varied. Third, the brightness of illumination is not adjustable and no mechanism is provided in relation to brightness adjustment to fit the day-night cycle of a day. For example, the relative importance of providing pathway during midnight, such as 2:00 pm or 3:00 pm, is much lower when comparing to early night-time. Also, the illumination effect for midnight period is more prominent than the early night-time period. There lacks any mechanism of control to effectively adapt the power consumption cycle of the pathway light in consistent to the requirement in the day-night cycle. Fourth, the power consumption of the light apparatus fails to equip with non-sunny days, such as rainy days or cloudy days. Since there is no light adjustable or control mechanism, the light apparatus is not prepared to face any non-sunny days and simply does not work during rainy or cloudy days. Fifth, the problem of insufficient charging during a particular cycle has greatly lowered the efficiency and the lifespan of the lighting apparatus. Since weather is unpredictable and the light apparatus has only one rigid cycle involving on/off status, insufficient charging is common and the lifespan of the lighting apparatus is shorter than expected. In other words, the light apparatus fails to adapt to the weather which involves abnormal operation of the light apparatus and therefore the lifespan is short and hence the efficiency is low.

The conventional garden pathway light apparatus also has other undesirable constraints in relation to its structural. In particular, the light apparatus may provide a tapered end so that the light apparatus can be more easily inserted into the soil or sand of a ground surface. However, when a level of hardness of the ground surface is very high, it is not possible to position the light apparatus onto the ground surface. When the only available ground surface is concrete, the light apparatus lacks any structural elements for support and therefore cannot be positioned on top of a concrete surface. In other words, the light apparatus is only suitable for use in relatively soft ground surface. In addition, because of the lack of supporting mechanism, the light apparatus is limited in utilization, which is garden pathway light for use in a garden with soil or sand ground surface.

The conventional garden pathway light apparatus is limited in shape and design because of the position requirement of the solar panel. In other words, a top surface or at least an inclined upper surface has to be included for positioning the solar panel for light absorption. Accordingly, the shape and design of the light apparatus is restricted.

SUMMARY OF THE PRESENT INVENTION

The invention is advantageous in that it provides a solar lighting apparatus comprising a light emitting unit and a solar panel arrangement for providing solar panel units such that a size of the solar pane unit is not restricted by a size of a top surface of the light emitting unit and a power of the light emitting unit is not restricted by the size of the top surface of the light emitting unit.

Another advantage of the invention is to provide a solar lighting apparatus which includes a lighting apparatus and a solar panel arrangement for providing solar panel units in which the solar panel units are not restricted to position at a top surface of a light apparatus body of the light apparatus, thereby exploiting the possibility of providing a solar panel unit having a larger size than the light apparatus body and the possibility of providing a light emitting unit of the light apparatus requiring higher power. Accordingly, the solar lighting apparatus can be expanded to be used in street light, entrance light, outdoor lamp and etc.

Another advantage of the invention is to provide a solar lighting apparatus which includes a lighting apparatus and a solar panel arrangement for providing solar panel units in which the solar panel units are not restricted to position at a top surface of the light apparatus body of the lighting apparatus, thereby providing design flexibilities for fitting different household needs.

Another advantage of the invention is to provide a solar lighting apparatus which includes a light apparatus and a solar panel arrangement for providing solar panel units which is adjustable to face different cardinal points.

Another advantage of the invention is to provide a solar lighting apparatus which includes a wiring arrangement having a plurality of connecting wire units so as to facilitate easy installation while providing flexibility in length adjustment.

Another advantage of the invention is to provide a solar lighting apparatus which includes a lighting apparatus comprising a light emitting unit and a light apparatus body, a solar panel arrangement providing solar panel unit in which the solar panel unit is not restricted to a position on the light apparatus body of the lighting apparatus, and a wiring arrangement having a plurality of connecting wire units connecting between the light emitting unit and the solar panel unit of the solar panel arrangement, thereby the light apparatus body is free from direct connection to the solar panel arrangement and therefore at least a part of the light apparatus body is capable of being detachable from the light apparatus body for easy replacement.

Another advantage of the invention is to provide a solar lighting apparatus which includes a lighting apparatus comprising a light emitting unit and a light apparatus body, a wiring arrangement having a plurality of connecting wire units, and a solar panel arrangement for providing a solar panel unit connected to the light emitting unit through the connecting wire unit such that a plurality of light apparatus bodies of different designs can be provided for the solar lighting apparatus to fit the market needs.

Another advantage of the invention is to provide a solar lighting apparatus which includes a light control arrangement to effectively utilize the solar energy to fit the day-night cycle of a day and to prepare for providing illumination during non-sunny days. thereby expanding the utility of the solar light apparatus as street light, entrance light, pathway, outdoor lamp and etc.

Another advantage of the invention is to provide a solar lighting apparatus which includes a mounting arrangement such that the light apparatus can be securely supported on any hard or soft ground surface, thereby expanding the utility of the solar light apparatus as street light, entrance light, pathway, outdoor lamp and etc.

Another advantage of the invention is to provide a solar lighting apparatus which includes a light emitting unit and a light apparatus body, a solar panel arrangement, and wiring arrangement connecting between the light emitting unit and the solar panel arrangement, and a mounting arrangement arranged for mounting onto a ground surface and connecting to the light apparatus body for supporting the solar light apparatus so as to facilitate easy but secure installation.

Additional advantages and features of the invention will become apparent from the description which follows, and may be realized by means of the instrumentalities and combinations particular point out in the appended claims.

According to the present invention, the foregoing and other objects and advantages are attained by a solar lighting apparatus, comprising:

a light emitting unit for providing illumination and a lighting apparatus body supporting the light emitting unit;

a solar energy arrangement arranged for providing power supply to the light emitting unit, comprising a solar panel unit at a predetermined position for light absorption; and a mounting arrangement which comprises a mounting plate; at least one ground supporting unit coupling with the mounting plate arranged for securing the mounting plate onto a ground surface; and a light apparatus connecting unit provided through the mounting plate arranged for connecting to the lighting apparatus such that the lighting apparatus is firmly positioned onto the ground through the mounting arrangement, thereby the lighting apparatus is capable of being mounting onto a hard or a soft floor surface.

In particular, the light emitting unit is a light emitting diode unit, the light apparatus body comprises a head unit supporting the light emitting unit; and a support unit having a first end connecting to the head unit and a second end arranged for positioning onto a ground surface through the mounting arrangement, the solar panel unit has a solar panel surface provided on the solar panel unit and the solar panel unit is positioned on the head unit of the light apparatus body in such a manner that the solar panel surface is exposed outwardly for light absorption.

It is worth mentioning that the solar lighting apparatus can comprise two light emitting units spacedly provided on and supported by the light apparatus body, which is has a street lamp construction having a predetermined height and weight and is supported through the mounting arrangement while the solar panel surface is provided between the two light emitting units.

Preferably, the mounting plate has four coupling holes spacedly provided on the mounting plate, the ground supporting unit comprises four supporting members having a cross-section area fitting and matching the four coupling holes such that the four supporting members are capable of being hammered or inserted onto the ground through penetrating the four coupling holes and anchored through the mounting plate to securely mounting into position, thereby the mounting arrangement is capable of providing sufficient support for standing the lighting apparatus onto the ground.

In accordance with another aspect of the invention, the present invention provides a solar lighting system which comprises at least two lighting apparatuses, each comprising a light emitting unit for providing illumination and a lighting apparatus body supporting the light emitting unit;

a solar energy arrangement arranged for providing power supply to the lighting apparatuses, comprising a solar panel unit for light absorption; and a wire arrangement connecting between the lighting apparatuses and the solar energy arrangement, wherein the solar panel unit is remotely connected to the lighting apparatuses through the wire arrangement and the solar panel unit is capable of providing a solar panel surface having a surface area substantially greater than the lighting apparatus body, wherein the wire arrangement comprises:

a wire connector unit having a first and a second connector unit terminals for each the light emitting unit;

a first wire unit having a first end electrically connecting to one the light emitting unit and a second end electrically connecting to the wire connector;

a second wire unit having a first end electrically connecting to the solar panel unit and a second end detachably and electrically connecting to the second connector unit terminal such that the first wire unit and the second wire unit are capable of being selectively and electrically connected through the wire connector;

thereby a distance between the light emitting units and a distance between each the light emitting unit and the solar panel unit are adjustable through adjusting a length of the the second wire unit such that a location of the solar panel unit is not strictly limited by the distance between each the light emitting unit and the solar panel unit and the solar panel unit can be placed at a particular location facing a particular direction for maximum light absorption.

Preferably, a LED light control arrangement is included for effectively controlling a power consumption of the light emitting unit in such a manner that the light emitting unit is arranged to being charged and discharged in a controlled manner and is protected against short circuit and overcharging.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
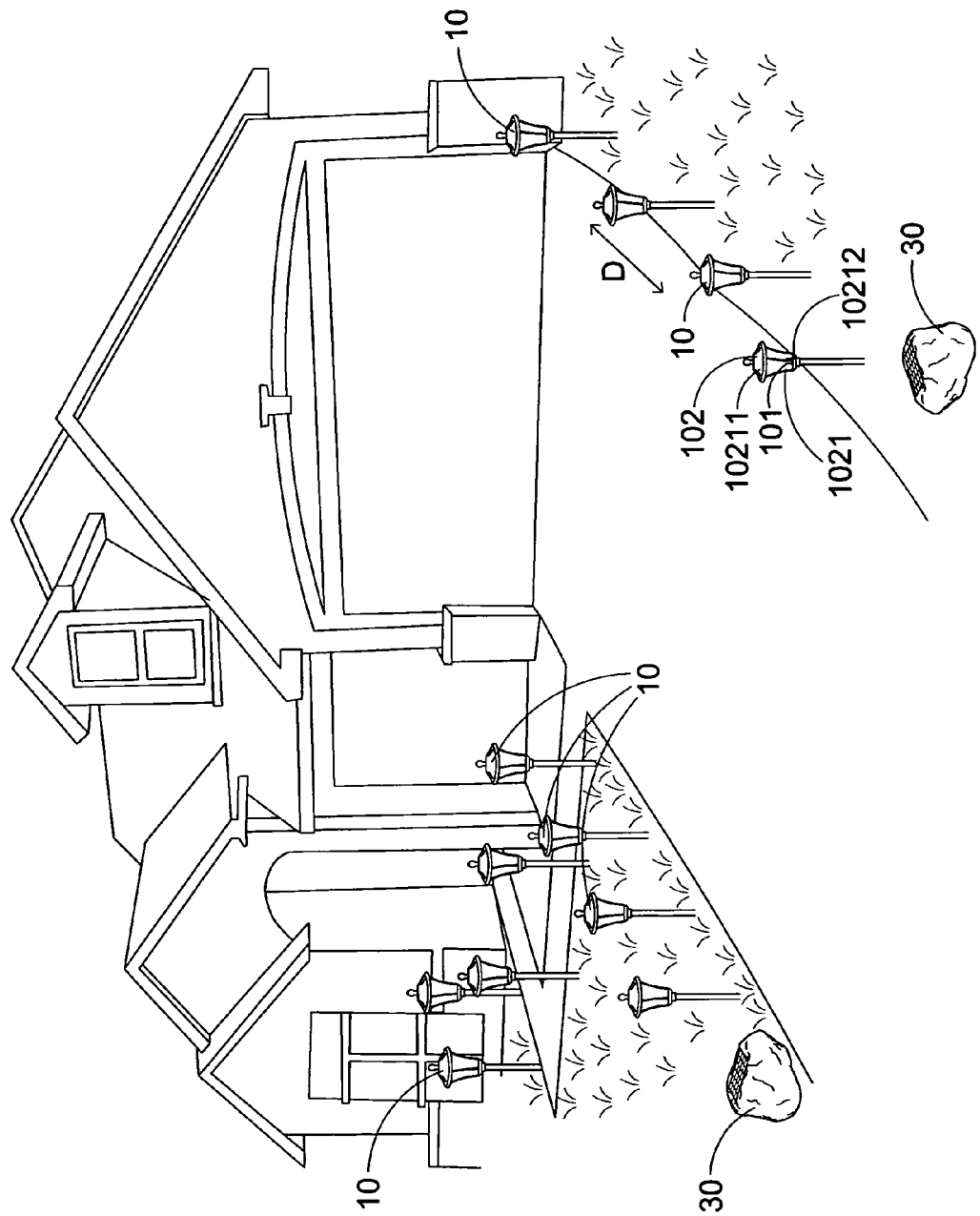
FIG. 1 is an illustration of a solar lighting apparatus and system according to a preferred embodiment of the present invention.

Referring to FIGS. 1-16 of the drawings, a solar lighting apparatus and system is illustrated, which includes a lighting apparatus 10 and a solar energy arrangement 30. Preferably, the solar lighting apparatus and system may further include a wire arrangement 50, a mounting arrangement 70 and a light control arrangement 90.

The lighting apparatus 10 includes a light emitting unit 101 for providing illumination, and a lighting apparatus body 102 supporting the light emitting unit 101. Preferably, the light emitting unit 101 is received inside the lighting apparatus body 102, thereby the light emitting unit 101 is protected and supported by the lighting apparatus body 102. Preferably, the light emitting unit 101 is a LED unit which has low power requirements.

The solar energy arrangement 30 includes a solar panel unit 301 for obtaining sunlight such that solar energy is absorbed by the solar panel unit 301 and is capable of supplying power to the light emitting unit 101 of the lighting apparatus 10. Accordingly, solar energy is converted into light energy for providing illumination.

Preferably, the solar lighting apparatus and system further includes a wire arrangement 50 comprising one or more connecting wire unit 501 connecting between the light emitting unit 101 of the lighting apparatus 10 and the solar panel unit 301 of the solar panel arrangement 30. Accordingly, the light apparatus body 102 of the lighting apparatus 10 is not required to have direct connection to the solar panel unit 301 and therefore position flexibility of the solar panel unit 301 and design options of the light apparatus body 102 are provided.

Preferably, the solar lighting apparatus and system further includes the mounting arrangement 70 which includes a mounting plate 701, at least one ground supporting unit 703 arranged for securing the mounting plate 701 onto a ground surface, and a light apparatus connecting unit 705 arranged for connecting to the lighting apparatus 10 such that the lighting apparatus 10 is firmly positioned onto the ground through the mounting arrangement 70. Through the provision of mounting arrangement 70, easy but secure installation is achieved. It is worth mentioning that the mounting plate 701 is capable of mounting onto a hard surface or a soft surface. For example, the mounting plate 701 can be secured into position on a concrete ground surface as well as a grass surface. In other words, the solar lighting apparatus can be installed onto any surface through the mounting arrangement 70.

Preferably, the solar lighting apparatus and system further includes the light control arrangement 90 connecting to the wire arrangement 50 arranged for controlling an operation process of the light emitting unit 101 of lighting apparatus 10 through communicating with the solar panel arrangement 30 and the light emitting unit 101. Accordingly, a digitalized light control such as multi-level light intensity adjustment can be provided by the light emitting unit 101 through the provision of the light control arrangement 90.

Referring to FIGS. 1 to 4 of the drawings, the solar light system according to the preferred embodiment of the present invention comprises at least two lighting apparatuses 10, each comprises a light emitting unit 101 for providing illumination and a light apparatus body 102 supporting the light emitting unit 101; a solar panel arrangement 30 comprising a solar panel unit 301 having a solar panel surface 3011 for light absorption connected to the light emitting unit 101 for providing power supply; and a wire arrangement 50 electrically connecting the solar panel unit 301 and the light emitting unit 101, wherein the wire arrangement 50 comprises a wire connector unit 502 having a first and a second connector unit terminals 5021, 5022, a first wire unit 501 having a first end 5011 connecting to the light emitting unit 101 and a second end 5012 detachably connecting to the first connector unit terminal 5021 of the wire connector unit 502, and a second wire unit 503 having a first end 5031 connecting to the solar panel unit 301 and a second end 5032 detachably connecting to the second connector unit terminal 5022 such that the first wire unit 501 and the second wire unit 503 is capable of being connected through the wire connector unit 503. Preferably, the wire connector unit 502 comprises an on/off switch 5023 through which the first wire unit 501 and the second wire unit 503 can be selectively connected at an on position of the on/off switch and disconnected at an off position of the on/off switch.

In particular, since the light emitting unit 101 and the solar panel unit 301 are connected through the wire connector unit 502, the farthest distance between the light emitting unit 101 and the solar panel unit 301 is directly correlated to a length of the second wire unit 503. In other words, the distance D between two lighting apparatuses 10 is adjustable by adjusting the length of the second wire unit 503 and by adjusting a connecting point on the second wire unit 503. In other words, through the provision of the wire connector unit 502, the distance between two particular lighting apparatuses 10 is adjustable. Accordingly, a location of the solar panel unit 301 is not strictly limited by the wired distance between the solar panel unit 301 and the lighting apparatuses 10, therefore the solar panel unit 301 can be placed at a particular location with desirable level of sunlight. The wire connector unit 502 also facilitates easy and simple installation.

Figure 2:
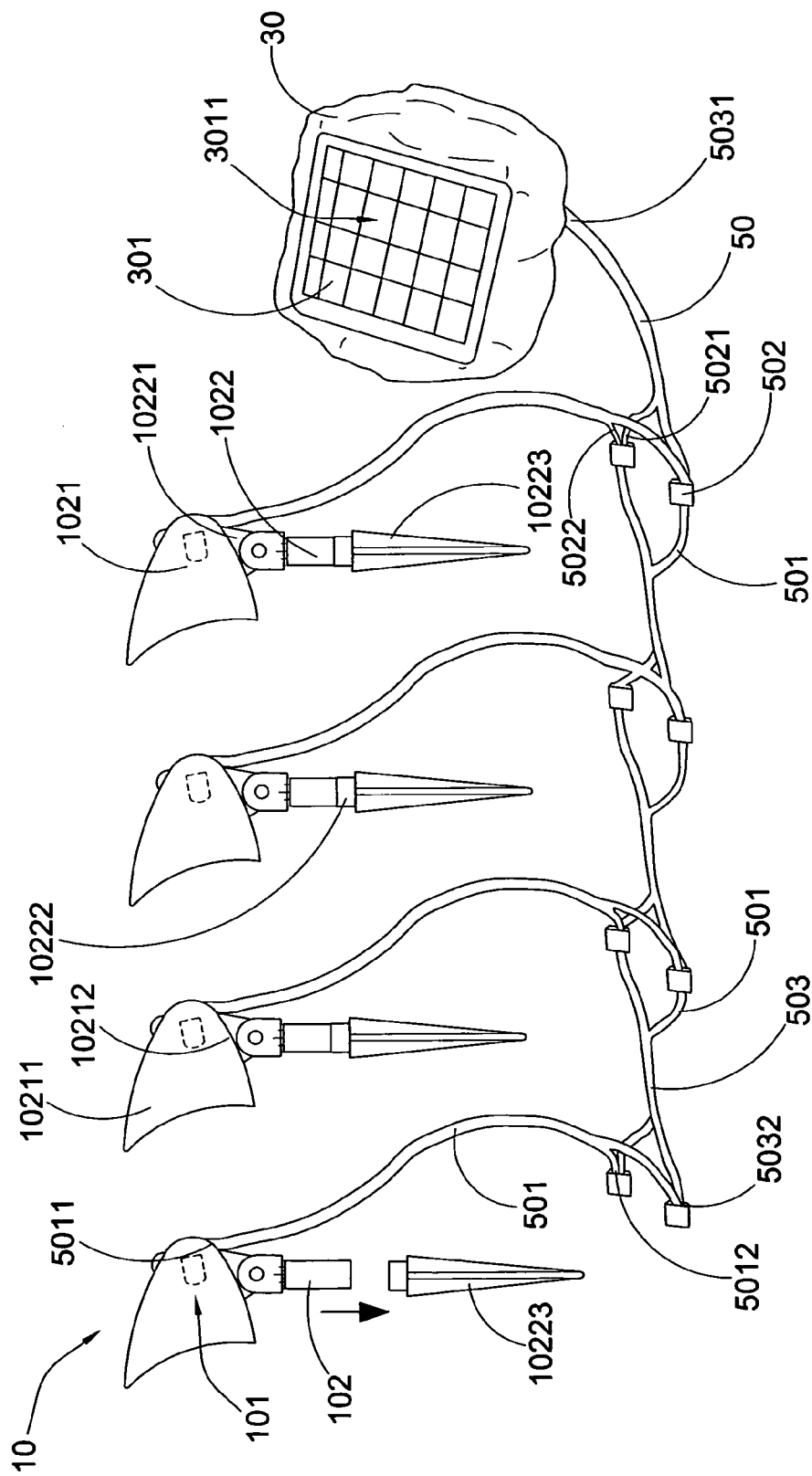
FIG. 2 is an illustration of a wire arrangement of the solar lighting system according to the above preferred embodiment of the present invention.
Figure 3:
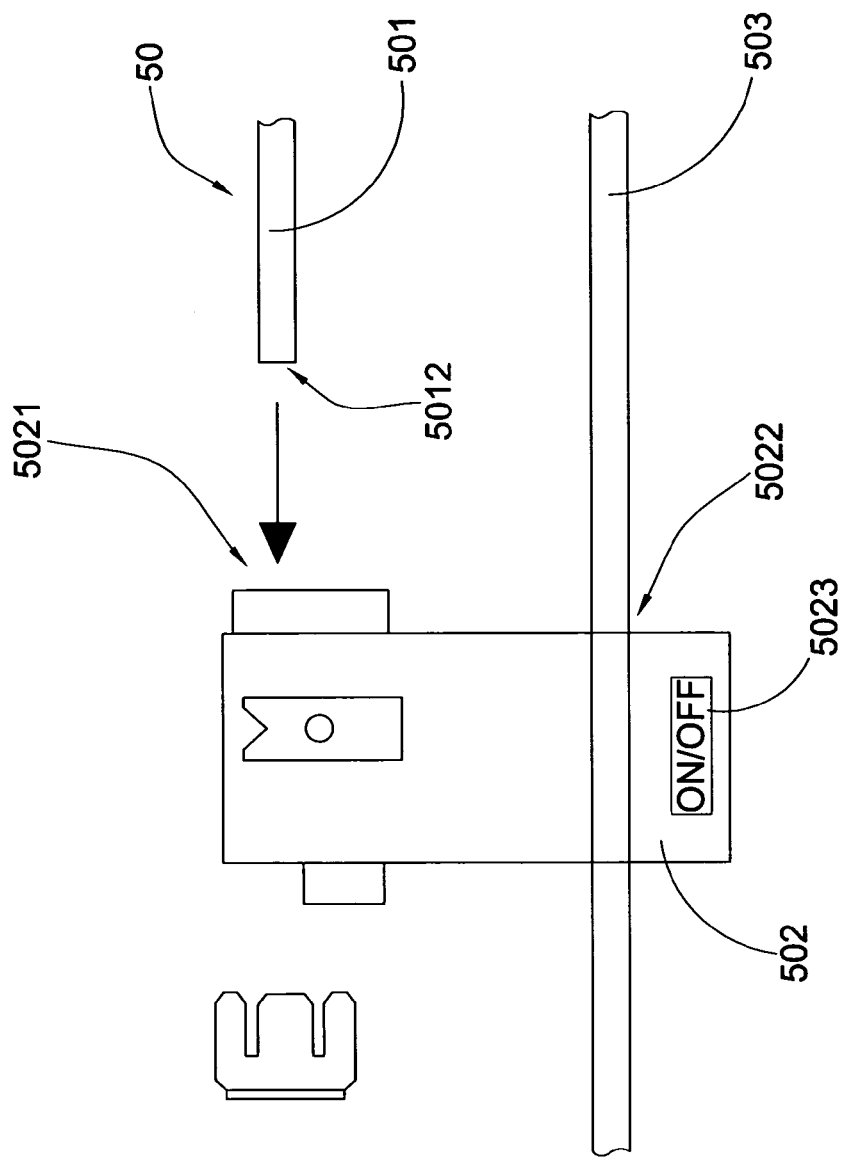
FIG. 3 is an illustration of a wire connector of the wire arrangement of the solar lighting system according to the above preferred embodiment of the present invention.

As shown in FIGS. 1 and 2 of the drawings, the light apparatus body 102 comprises a head unit 1021 receiving supporting the light emitting unit 101 and a support unit 1022 having a first end 10221 connecting to the head unit 1021 and a second end 10222 arranged for positioning onto a ground surface such that the light emitting unit 101 supporting by the head unit 1021 is elevated and standing on the ground surface through the support unit 1022. Since the solar panel surface 3011 is not required to be provided on the light apparatus body 102, design flexibilities of the light apparatus body 102 is greatly increased.

For example, as shown in FIG. 1 of the drawings, the lighting apparatus 10 has a courtyard style in which the head unit 1021 of the light apparatus body 102 includes a top head unit 10211 having four top inclined surfaces facing four different direction and a bottom head unit 10212 having a supporting base for receiving and supporting the light emitting unit 101 and a window allowing light penetration.

For example, as shown in FIG. 2 of the drawings, the lighting apparatus 10 has a spotlight style in which the head unit 1021 of the light apparatus body 102 includes a top head unit 10211 having an inverted cup-shape receiving and supporting the light emitting unit 101 and a bottom head unit 10212 serving as an adjustable supporting base supporting the top head unit 10211.

In other words, the head unit 1021 is not required to have a large or flat surface accommodating light absorption. The head unit 1021 is free from utilizing a maximum surface provided by the head unit 1021 for light absorption and design flexibilities of the light apparatus body 102 is greatly increased to fit people's need.

Preferably, as shown in FIGS. 1 and 2 of the drawings, the second end 10222 of the support unit 1022 of the light apparatus body 102 comprises a tapered unit 10223 providing sharp edges for inserting onto a ground surface. The tapered unit 10223 can be integrally or detachably connected at the second end 10222 of the support unit 1022 of the light apparatus body 102.

Figure 4:
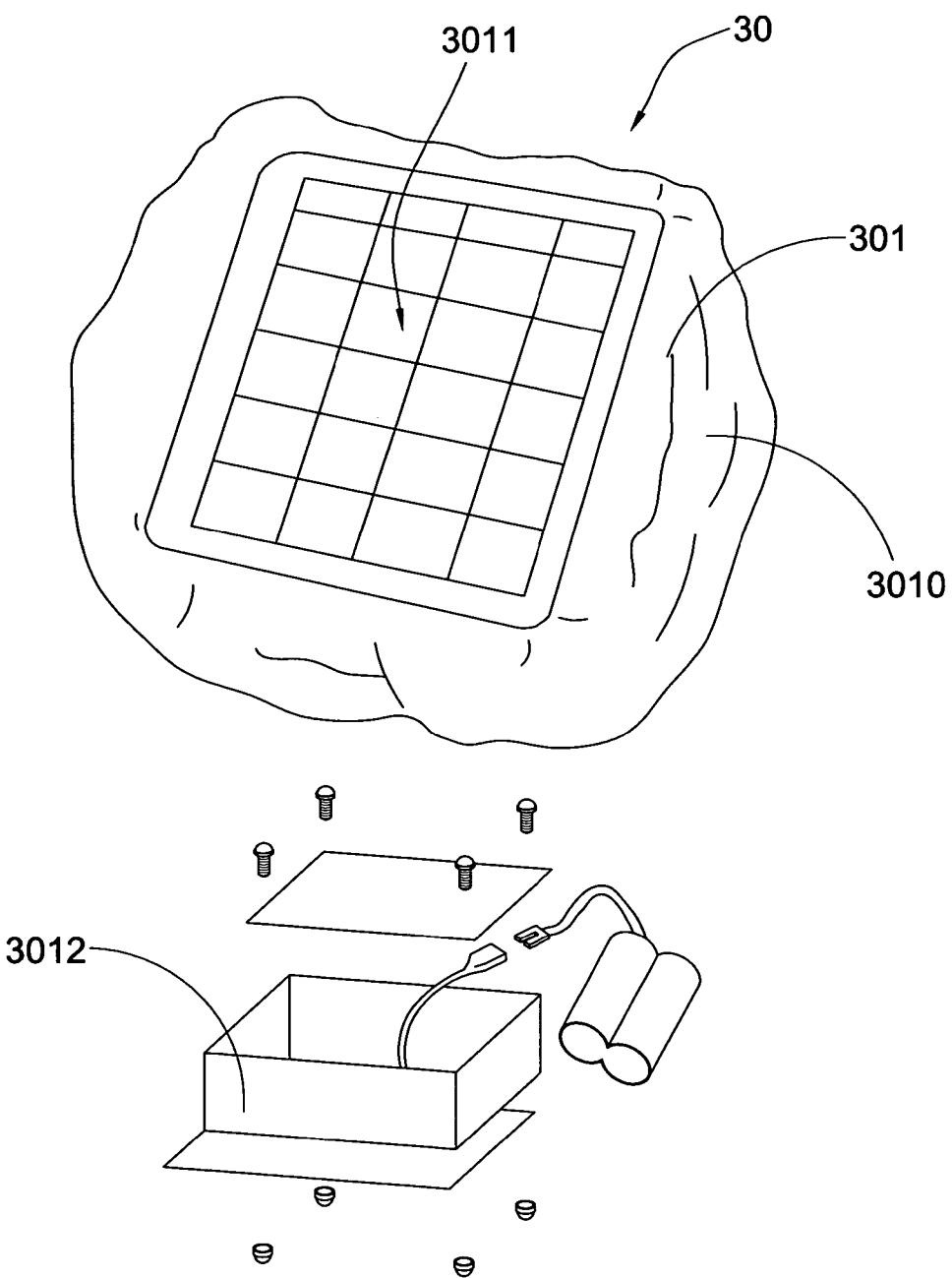
FIG. 4 is an illustration of a solar panel arrangement of the solar lighting system according to the above preferred embodiment of the present invention.

Referring to FIGS. 1, 2 and 4 of the drawings, the solar energy arrangement 30 includes a solar panel unit 301 arranged for obtaining solar energy connected to the light emitting unit 101 through the wire arrangement 50. In particular, the solar energy arrangement 30 comprises a solar panel body 3010 on which the solar panel surface 3011 of the solar panel unit 301 is positioned such that the solar panel surface 3011 is exposed outwardly at an optimized position for light absorption.

Preferably, the solar panel body 3010 has a hollow body defining a battery compartment arranged for receiving a battery member and the solar panel unit 301 is detachably connected to the battery member. Accordingly, the battery member can be replaced easily through simple steps.

As shown in FIG. 4 of the drawings, a battery casing 3012 is provided to enclose the battery compartment inside which the battery member is received. Therefore, the battery member is shielded and protected inside the battery compartment. It is worth mentioning that the battery casing 3012 is detachable connected to and received inside the solar panel body 3010 such that the battery casing 3012 is further protected by the solar panel body 3010. In addition, the solar panel body 3010 is embodied as a resin stone, as shown in FIG. 4, which is designed to match the outdoor environment or mimicking natural rock object in a garden. In other words, through different designs and appearances of the solar panel body 3010, it is possible to hide the solar panel body 3010 outside a house or building while exposing the solar panel surface 3011.

Referring to FIGS. 5 to 9 of the drawings, a plurality exemplary embodiments of solar light system according to the preferred embodiment of the present invention are illustrated. Since the position of the solar panel surface 3011 is not restricted to be provided on any surface of the lighting apparatus 10, a great number of design options and application possibilities can be realized. In particular, a surface area of the solar panel surface 3011 is not limited by a size of the lighting apparatus 10, therefore one solar panel surface 3011 can be sufficient to provide energy to a series of lighting apparatuses 10. Alternately, one solar panel surface 3011 having sufficiently large surface area can provide sufficient power for lighting apparatuses 10 having higher voltage requirement.

Figure 5:
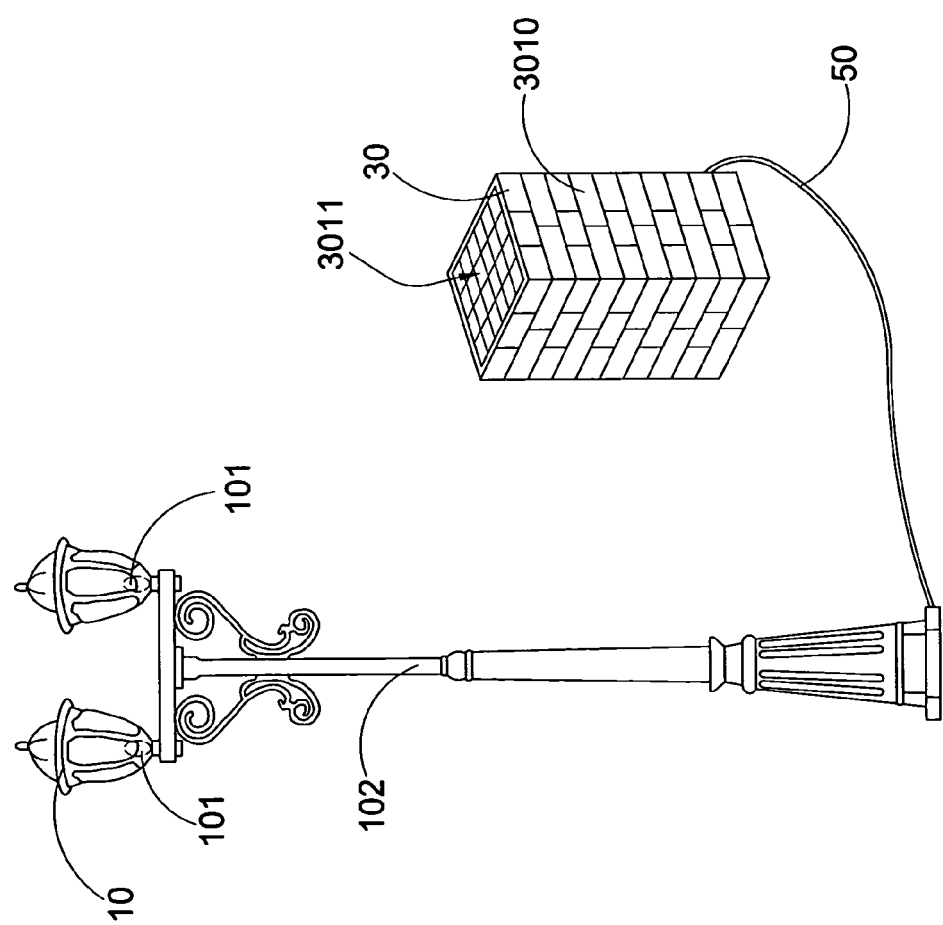
FIG. 5 is another illustration of the solar lighting apparatus and system according to the above preferred embodiment of the present invention

For example, as shown in FIG. 5 of the drawings, the lighting apparatus 10 is embodied as a lamp post or light post comprising two light emitting units 101. It is worth mentioning that the solar panel arrangement 30 can be used to support one or more lighting apparatuses 10, even the individual voltage requirement of the lighting apparatus 10 is relatively high. The solar panel body 3010 of the solar panel arrangement 30 can be constructed into any design for matching the surrounding environment and is arranged for locating at a position for optimized sunlight exposure.

Figure 6:
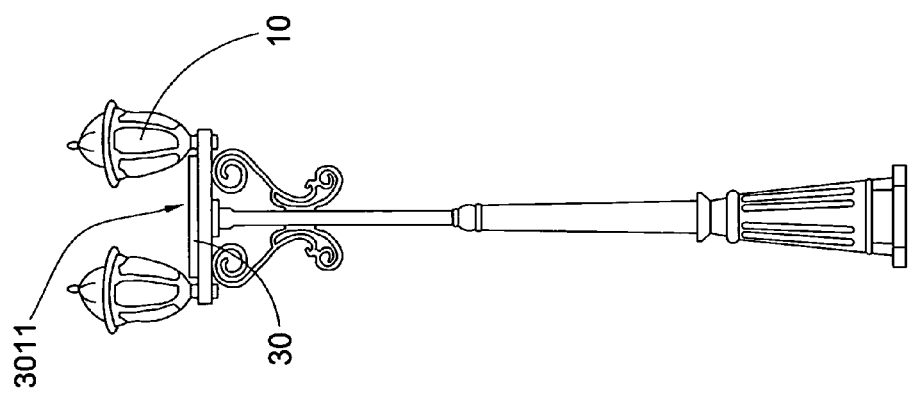
FIG. 6 is another illustration of the solar lighting apparatus according to the above preferred embodiment of the present invention.

For example, as shown in FIG. 6 of the drawings, the solar light system according to the preferred embodiment of the present invention comprises two lighting apparatuses 10 and the solar panel arrangement 30 is positioned between the two lighting apparatuses 10. In other words, the solar light system is embodied as a standalone lamp post comprising two light apparatuses 10 and the solar panel arrangement 30 can effectively utilize the area between the two light apparatuses 10 for providing a sufficiently large surface area for the solar panel surface 3011 so that sufficient power can be provided to the lamp post, which is the solar light system according to the preferred embodiment of the present invention.

Figure 7:
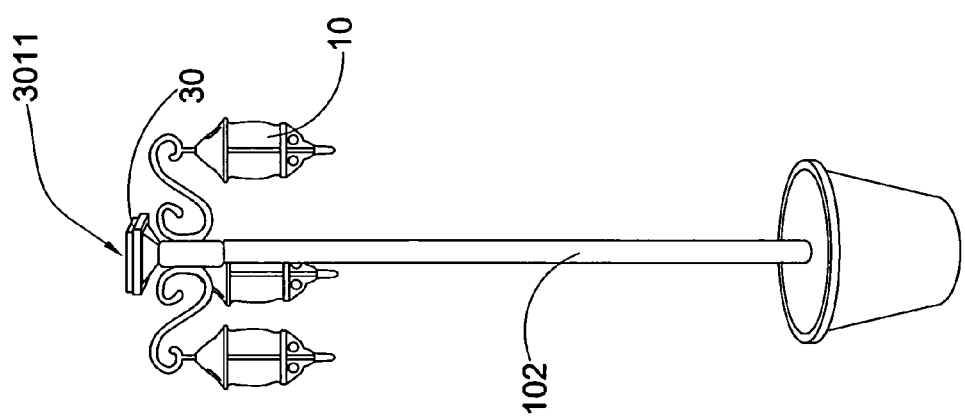
FIG. 7 is another illustration of the solar lighting apparatus according to the above preferred embodiment of the present invention.

For example, as shown in FIG. 7 of the drawings, the solar panel surface 3011 of the solar panel unit 301 is provided on the lamp post and therefore different design possibilities of lamp posts can be employed to fit the market needs. Referring to FIG. 6 of the drawings, a city street style lamp post is illustrated. On the other hand, a garden style lamp post is illustrated in FIG. 7 of the drawings.

Figure 8:
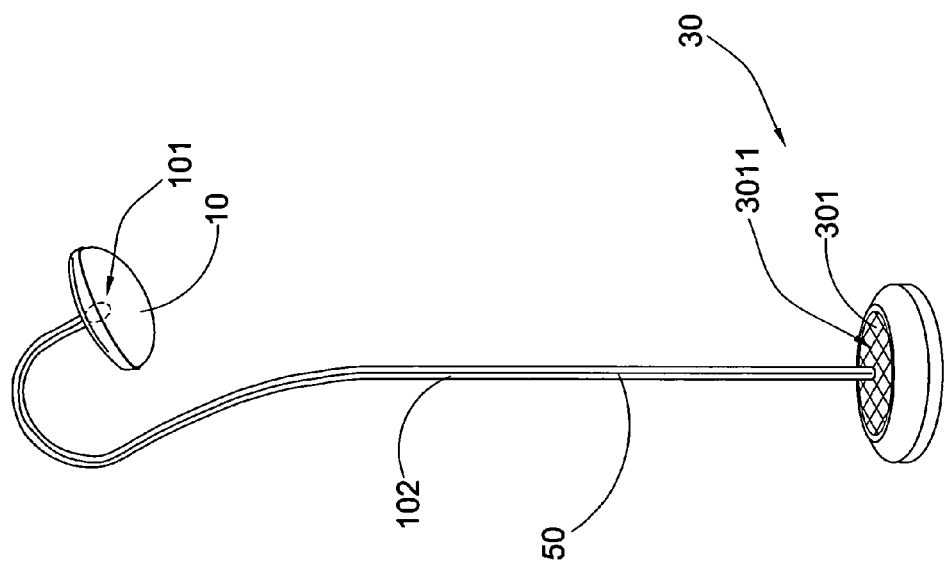
FIG. 8 is another illustration of the solar lighting apparatus according to the above preferred embodiment of the present invention.
Figure 9:
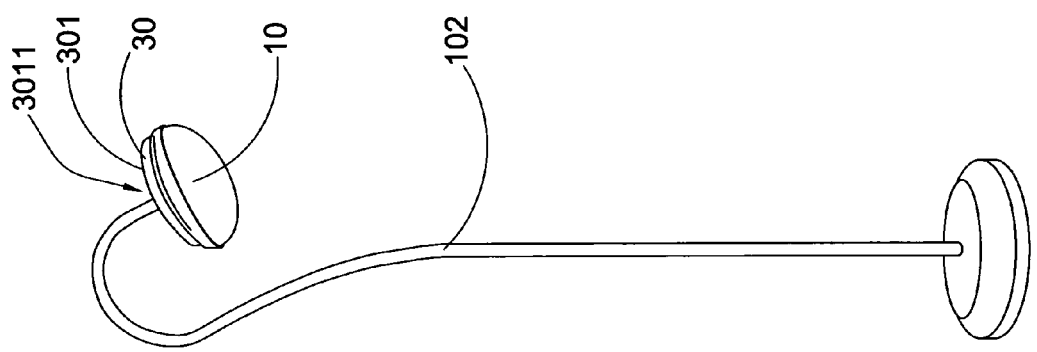
FIG. 9 is another illustration of the solar lighting apparatus according to the above preferred embodiment of the present invention.

For example, as shown in FIGS. 8 and 9 of the drawings, the solar light system according to the preferred embodiment of the present invention can also be embodied as an outdoor lighting apparatus. Because of the provision of the lighting apparatus 10, the solar panel arrangement 30 and the wire arrangement 50, the solar light system can obtain sufficient power from the solar panel arrangement 30 and be easily connected by utilizing the wire arrangement 50. Accordingly, it is also possible to provide an outdoor floor lamp or a floor lamp through the solar light system according to the preferred embodiment of the present invention.

In particular, as shown in FIG. 8 of the drawings, the floor lamp, which is one of the exemplary embodiment of the solar light system according to the preferred embodiment of the present invention comprises the solar panel arrangement 30 constructed into a bottom supporting base of the floor lamp. In other words, a large surface area can be provided for positioning the solar panel surface 3011 through the bottom supporting base of the floor lamp to provide energy to the floor lamp.

Referring to FIG. 9 of the drawings, an alternative position of the solar panel surface 3011 for the floor lamp, which is the solar light system according to the preferred embodiment of the present invention, is illustrated.

Preferably, the solar light system according to the preferred embodiment of the present invention further comprises a mounting arrangement 70 for mounting the lighting apparatus 10 securely on a ground floor. Conventional method of mounting usually utilizes a shaft object for providing support and is not strong enough for securing a lamp or light post, a floor lamp or even a pathway light of bigger size onto the floor. In addition, this kind of conventional supporting shaft can only be used on the ground with soil or sand texture. The mounting arrangement 70 of the solar light system according to the preferred embodiment of the present invention is sufficiently strong for holding lighting apparatus 10 of larger size and weight, easy for installation and flexible for use in ground textures In particular, the mounting arrangement 70 of the solar light system can effectively secure the lighting apparatus 10 onto a sand floor or a concrete floor.

Figure 10:
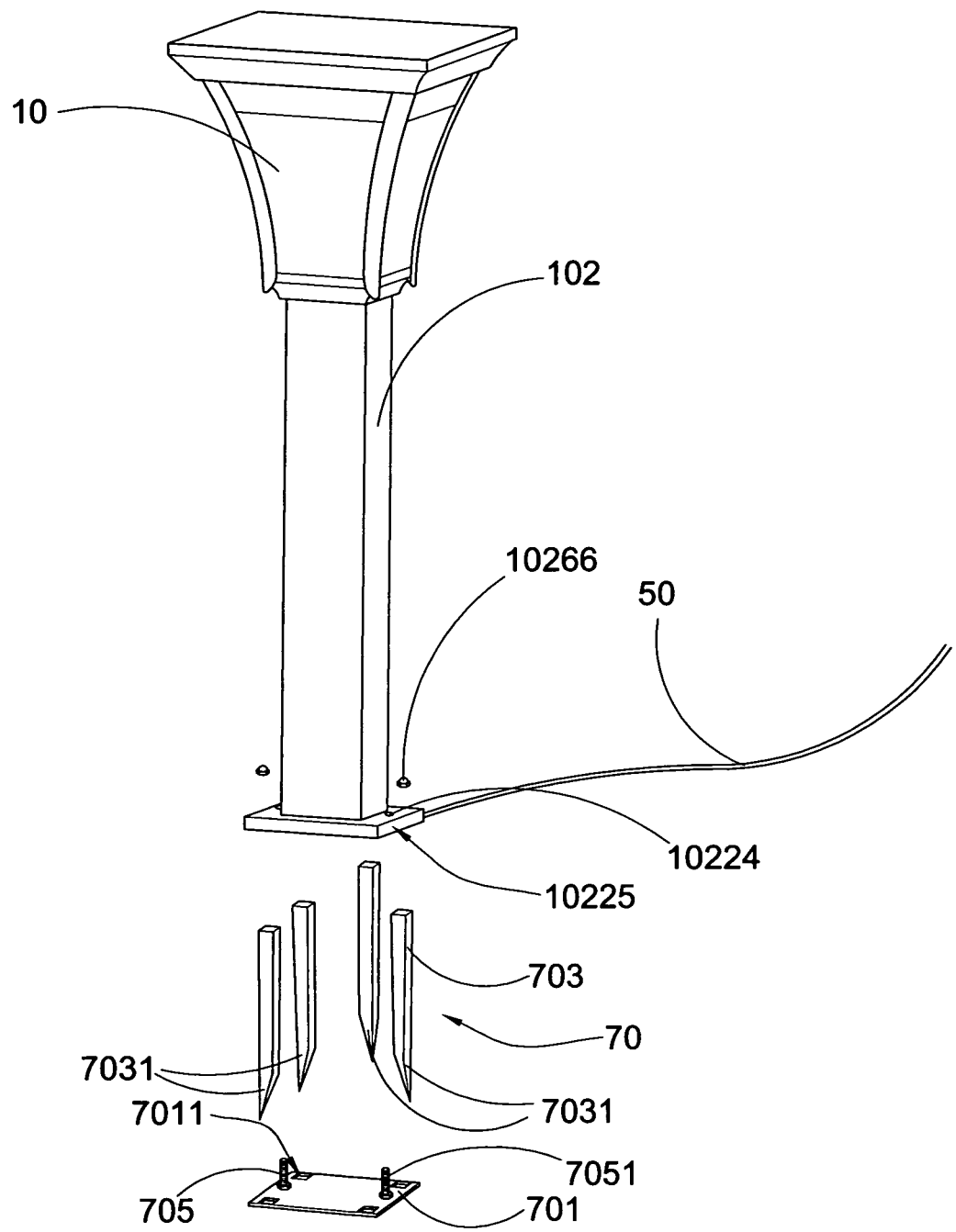
FIG. 10 is an illustration of a mounting arrangement of the solar lighting apparatus according to the above preferred embodiment of the present invention.
Figure 11:
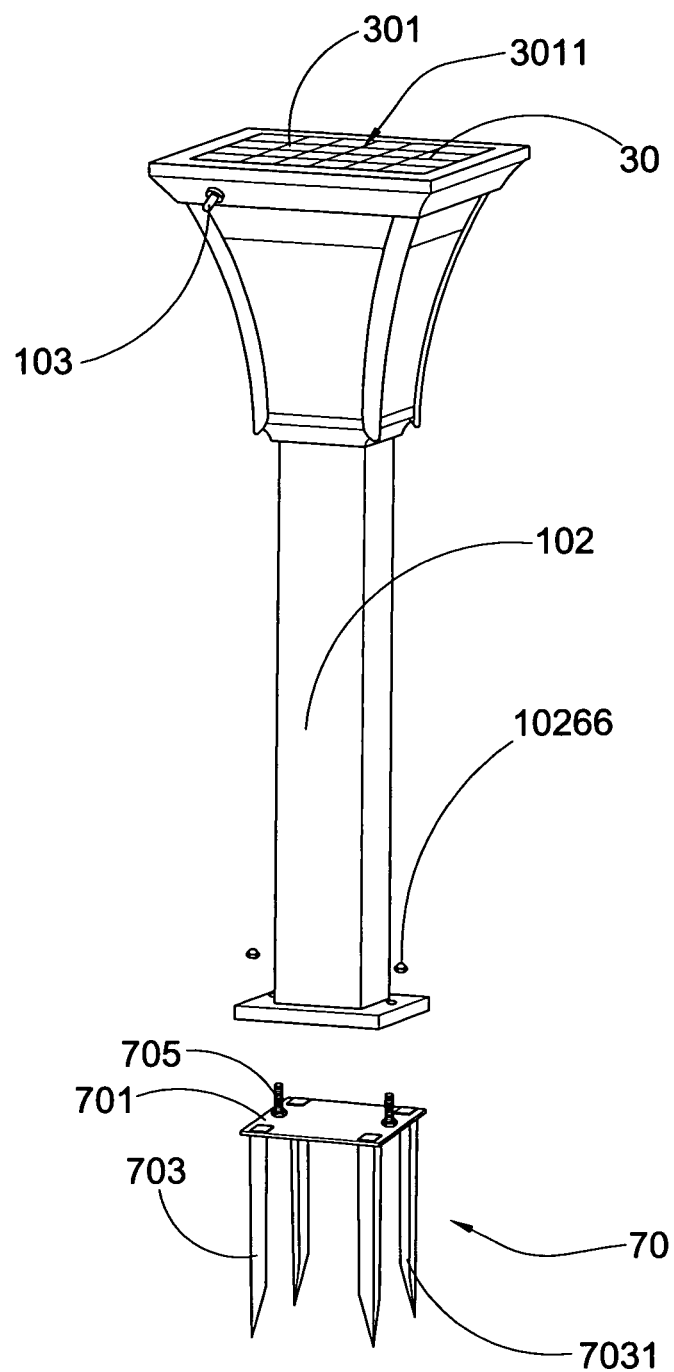
FIG. 11 is another illustration of the solar lighting apparatus with a mounting arrangement according to the above preferred embodiment of the present invention.

Referring to FIGS. 10 and 11 of the drawings, the mounting arrangement 70 comprises a mounting plate 701, a ground supporting unit 703 arranged for coupling with the mounting plate 701 and for inserting into a ground floor so as to secure the mounting plate 701 onto the ground floor, and a light apparatus supporting unit 705 provided on the mounting plate 701 arranged for connecting to the lighting apparatus 10.

In particular, referring to FIGS. 10 to 13 of the drawings, the solar light system according to the preferred embodiment of the present invention comprises at least two lighting apparatuses 10, each comprises a light emitting unit 101 for providing illumination and a light apparatus body 102 supporting the light emitting unit 101; a solar panel arrangement 30 comprising a solar panel unit 301 having a solar panel surface 3011 for light absorption connected to the light emitting unit 101 for providing power supply; a wire arrangement 50 electrically connecting the solar panel unit 301 and the light emitting unit 101; and a mounting arrangement 70 arranged for securing the lighting apparatuses 10 onto the ground, wherein the wire arrangement 50 comprises a wire connector unit 502 having a first and a second connector unit terminals 5021, 5022, a first wire unit 501 having a first end 5011 connecting to the light emitting unit 101 and a second end 5012 detachably connecting to the first connector unit terminal 5021 of the wire connector unit 502, and a second wire unit 503 having a first end 5031 connecting to the solar panel unit 301 and a second end 5032 detachably connecting to the second connector unit terminal 5022 such that the first wire unit 501 and the second wire unit 503 is capable of being connected through the wire connector unit 503, wherein the mounting arrangement 70 comprises a mounting plate 701, a ground supporting unit 703 arranged for coupling with the mounting plate 701 and for inserting into a ground floor so as to secure the mounting plate 701 onto the ground floor, and a light apparatus supporting unit 705 provided on the mounting plate 701 arranged for connecting to the lighting apparatus 10.

Preferably, as shown in FIG. 10 of the drawings, the mounting plate 701 of the mounting arrangement 70 is a rectangular metal plate having four coupling holes 7011 provided at four corners of the metal plate, the ground supporting unit 703 includes four supporting members 7031 having a cross-sectional area fitting and matching the four coupling holes 7011 of the mounting plate 701. Accordingly, the four supporting members 7031 can be hammered onto the ground through penetrating the four coupling holes 7011 such that the mounting plate 701 can be secured into position onto the ground through the supporting members 7031.

For example, as shown in FIG. 10 of the drawings, the supporting members 7031 are iron stakes which is arranged for supporting a lamp post, which is the solar lighting system of the present invention.

It is worth mentioning that the mounting plate 701 can also made of synthetic plastic or other materials having a round-shaped plate body or a square-shaped plate body providing at least one coupling hole 7011 at a predetermined position such that the mounting plate 701 is capable of being mounted onto a ground floor through coupling of the coupling hole 7011 and the supporting member 7031 of the ground supporting unit 703, thereby the mounting plate 701 can provide a secure support to the lighting apparatus 10 through the light apparatus connecting unit 705 of the mounting 701. The material and shape of the mounting arrangement 70, the number of coupling hole 7011 and the number of supporting member 7031 are selectively adjustable, depending on the design requirements of the lighting apparatus 10.

Preferably, as shown in FIGS. 10 to 13 of the drawings, the second end 10222 of the support unit 1022 of the light apparatus body 102 comprises a light support connector 10224 connected to the light apparatus supporting unit 705 in such a manner that the lighting apparatus 10 is securely supported and positioned onto the ground through the mounting arrangement 70. In particular, the light apparatus supporting unit 705 comprises two shaft members 7051 transversely extended from the mounting plate 701 while the light support connector 10224 at the second end 10222 of the support unit 1022 of the light apparatus body 102 provides two light support connector holes 10225 and two locking members 10226 in which the two light support connector holes 10225 are positioned and sized to fit and couple with the two shaft members 7051 arranged for locking into position by the locking members 10226. As shown in FIG. 10 of the drawings, the shaft member 7051 and the locking member 10226 have a bolt and nut relationship, wherein the shaft member 7051 is a bolt and the locking member 10226 is a nut for coupling with the bolt of the shaft member 7051.

Figure 12:
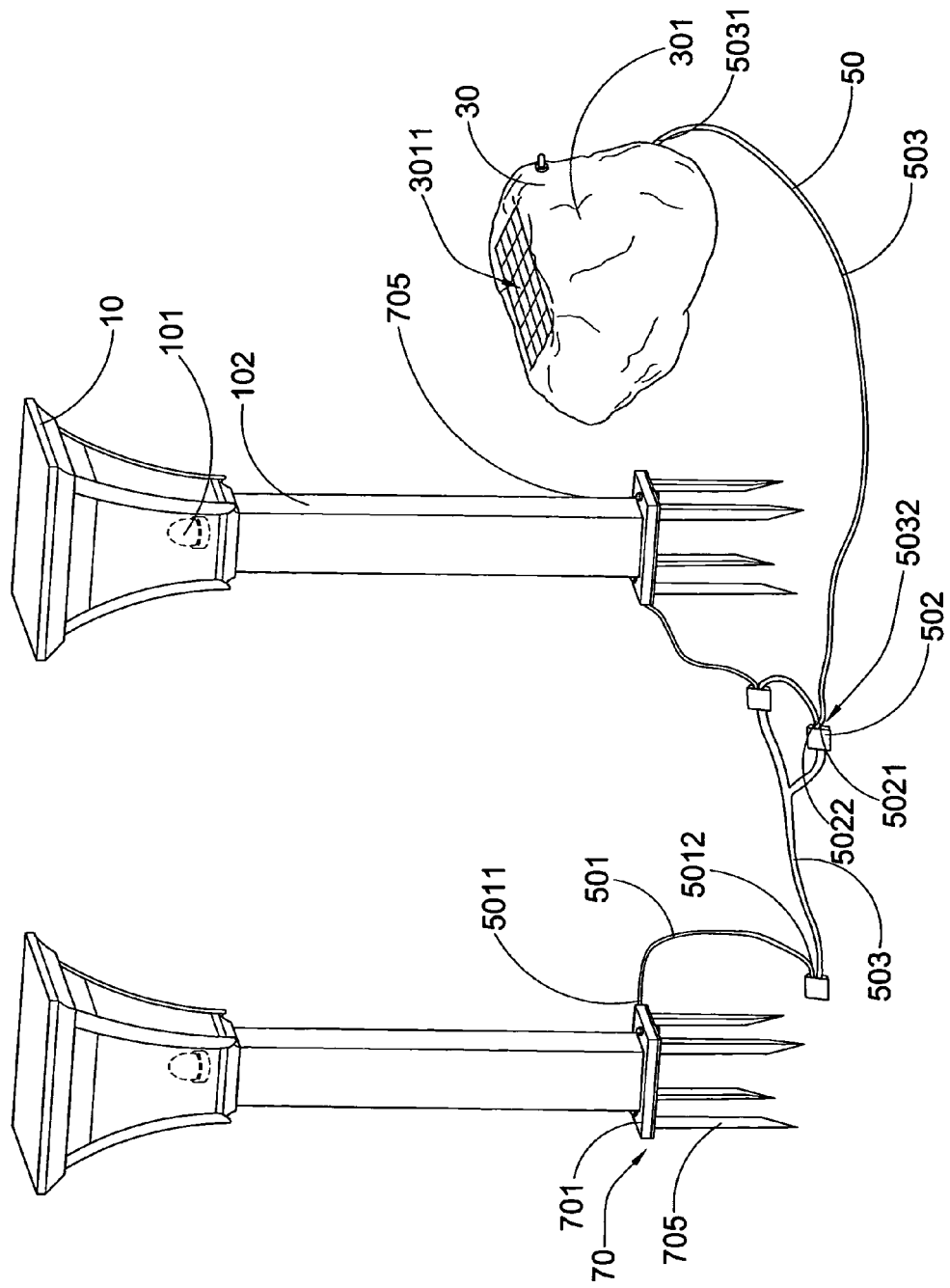
FIG. 12 is another illustration of the solar lighting system showing a solar panel arrangement, a wire arrangement and a mounting arrangement according to the above preferred embodiment of the present invention.

It is worth mentioning that the mounting arrangement 70 enables the lighting apparatus 10 to mount on a concrete ground surface. For example, as shown in FIGS. 11 and 12 of the drawings, the solar light system which is embodied as an entrance light system according to the preferred embodiment of the present is illustrated. The entrance light can be mounted onto a concrete or a hard ground surface through the mounting arrangement 70. It is worth mentioning that a light switch 103 is further provided for controlling an on/off status of the light emitting unit 101 of the lighting apparatus 10.

It is worth mentioning that the solar panel unit 301 or the solar panel surface 3011 is not restricted to be provided on the light apparatus body 102 through the wire arrangement 50. For example, as shown in FIG. 11 of the drawings, the solar panel surface 3011 is provided on the head unit 1021 of the light apparatus body 102. Alternately, as shown in FIG. 12 of the drawings, the solar panel surface 3011 is not provided on any part of the light apparatus body 102 and is arranged to position at a distance from the light apparatus body 102 through the wire arrangement 50.

Figure 14:
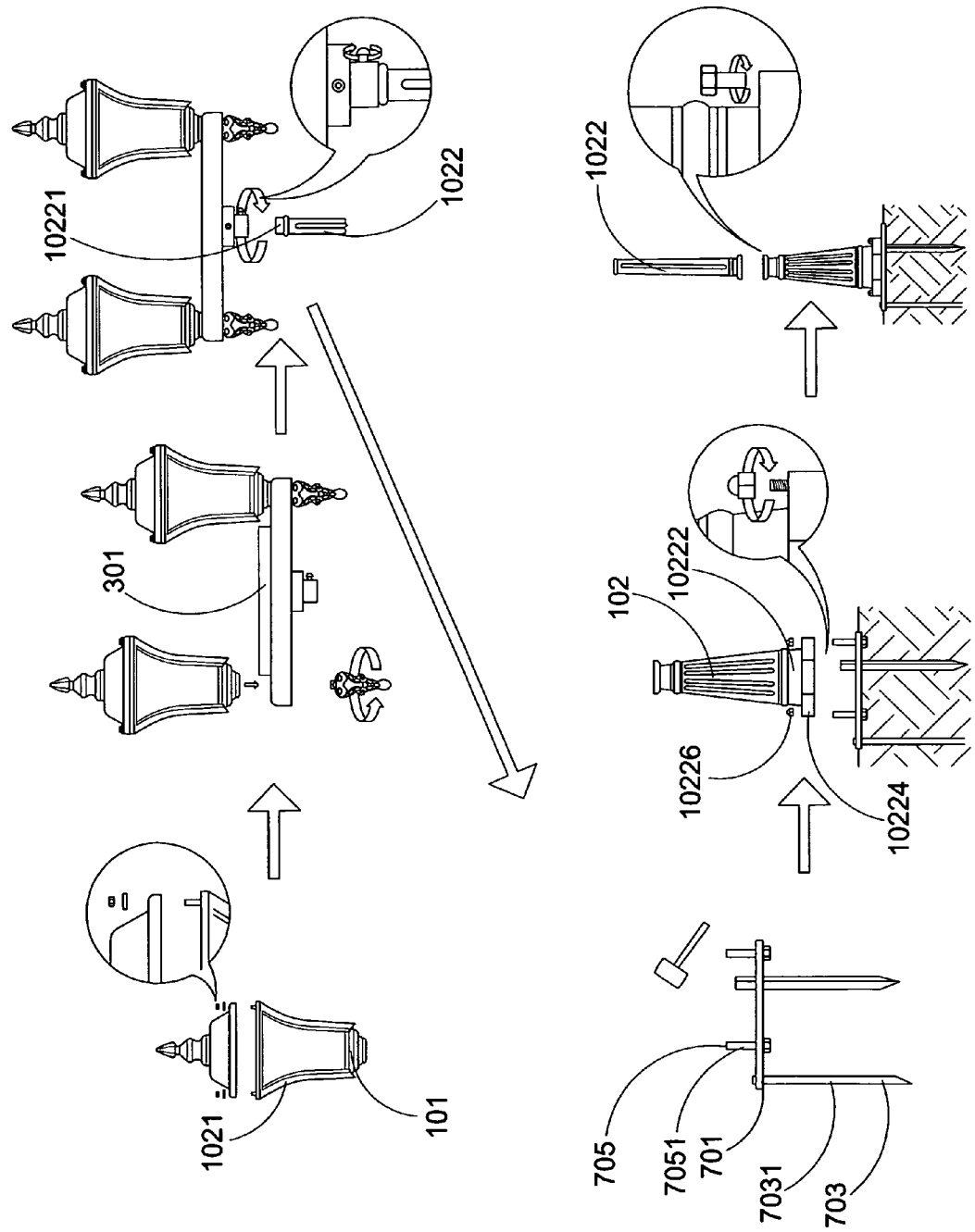
FIG. 14 is an illustration of a process of installation of the solar lighting apparatus according to the above preferred embodiment of the present invention.

Referring to FIGS. 10 and 14 of the drawings, a mounting method of the lighting apparatus 10 comprising a light emitting unit 101 for providing illumination, a light apparatus body 102 supporting the light emitting unit 101 which comprises a light support connector 10224, a solar panel arrangement 30 connected to the light emitting unit 101 arranged for light absorption and providing power to the light emitting unit 101, a wire arrangement 50 connecting between the solar panel arrangement 30 and the light emitting unit 101, and a mounting arrangement 70 arranged for mounting the light apparatus body 102 onto a ground surface comprising a mounting plate 701, a ground supporting unit 703 and a light apparatus connecting unit 705 provided on the mounting plate 701 respectively, comprises the steps of:

(a) positioning the mounting plate 701 onto the ground surface;

(b) inserting the ground supporting unit 703 onto the ground surface such that the ground supporting unit 703 is biased against the mounting plate 701 to lock the mounting plate 701 into position on the ground surface; and (c) coupling the light apparatus connecting unit 705 and the light support connector 10224 such that the light apparatus connecting unit 705 and the light support connector 10224 are locked into position, thereby the light apparatus body 102 is securely connected to the mounting plate 701 through light apparatus connecting unit 705 and is supported onto the ground through the mounting plate 701 being securely supported by the ground supporting unit 703.

Preferably, the mounting plate 701 is a metallic plate, the ground supporting unit 703 includes ground supporting member 7031 having an iron shaft body, the light apparatus connecting unit 705 includes a shaft member 7051 transversely and upwardly extended from the mounting plate 701 and the light support connector 10224 provides a light support connector hole 10225 and a locking member 10226 for coupling and locking into position with the shaft member 7051.

When the ground surface is very hard, such as a concrete ground surface, a complementary ground connecting hole can be pre-drilled such that the ground supporting unit 703 can be inserted into the ground connecting hole for mounting the mounting plate 701 onto the ground, and then the lighting apparatus 10 can be supported by the mounting plate 701 onto the concrete ground surface.

Figure 13:
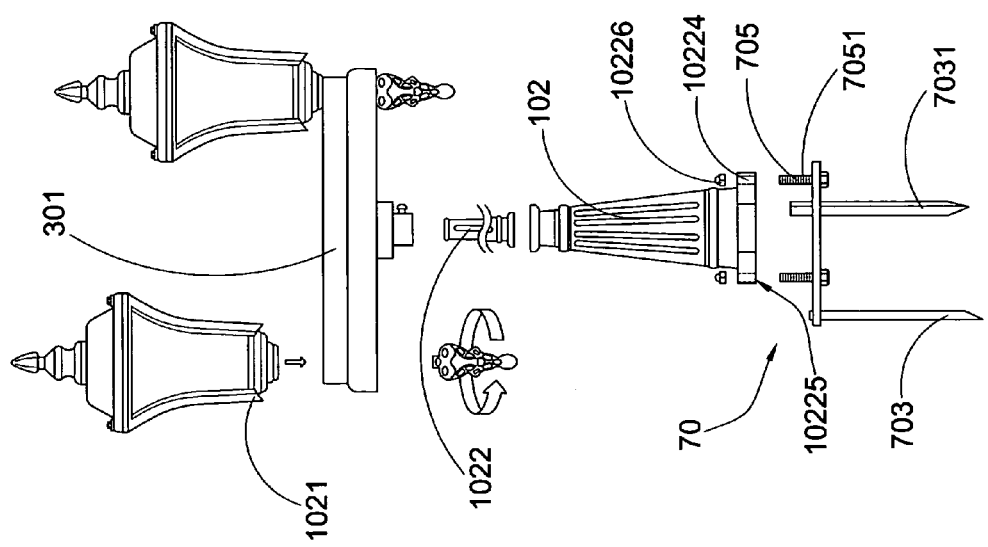
FIG. 13 is another illustration of the solar lighting apparatus according to the above preferred embodiment of the present invention.

Preferably, the solar lighting system according to the preferred embodiment of the present invention includes a plurality of detachable parts for facilitating easy mix and match assembly. As shown in FIGS. 13 and 14 of the drawings, the head unit 1021 is detachably connected to the support unit 1022, the solar panel unit 301 is detachably connected between the head unit 1021 and the support unit 1022 of the light apparatus body 102 while the support unit 1022 of the light apparatus body 102 is detachably connected to the mounting plate 701 of the mounting arrangement 70. In other words, different parts of the solar lighting system or apparatus can be manufactured separately, facilitating mass production of different parts of the solar lighting system of the present invention. Also, the design or style of the head unit 1021 of the light apparatus body 102 can be changed or replaced easily through this detachable connection between different parts of the lighting apparatus 10 and the solar lighting system. In other words, more design varieties can be provided through changing the design of one part, such as the head unit 1021 of the light apparatus body 102, at minimized cost which involves only changes to one part of the whole solar lighting system.

Referring to FIG. 14 of the drawings, an installation process of the solar light system according to the preferred embodiment of the present invention is illustrated. In this embodiment, the solar lighting system is a standalone lamp post which includes two light emitting units 101 and the solar panel unit 301 is provided between the two light emitting units 101.

The installation process of the solar light system comprises the steps of:

(a) assembling the head unit 1021 with which the two light emitting unit 101 are connected and covered;

(b) securing the head unit 1021 onto the solar panel unit 301;

(c) installing the mounting plate 701 onto the ground surface with the ground supporting unit 703;

(d) mounting the light support connector 10224 to the light connecting unit 705 of the mounting plate and securing into position; and (e) connecting the light support connector 10224 to the second end 10222 of the support unit 1022 while connecting the first end 10221 of the support unit 1022 to the solar panel unit 301.

Accordingly, the installation process involves only simple steps which are simple and handy for a layperson. In other words, the utilization of solar energy powered lighting apparatus or system of the present invention can be promoted at household level so as to increase the usage of solar energy without difficulties in relation to installation or limitation in relation to texture of ground surface. For example, the present invention can be used as street lamp, floor lamp, outdoor pathway light, garden light, garden spotlight, entrance light and etc. The vast varieties of design possibilities provided through the construction and design of the present invention have increased the application of solar lighting apparatus and system dramatically.

Figure 15:
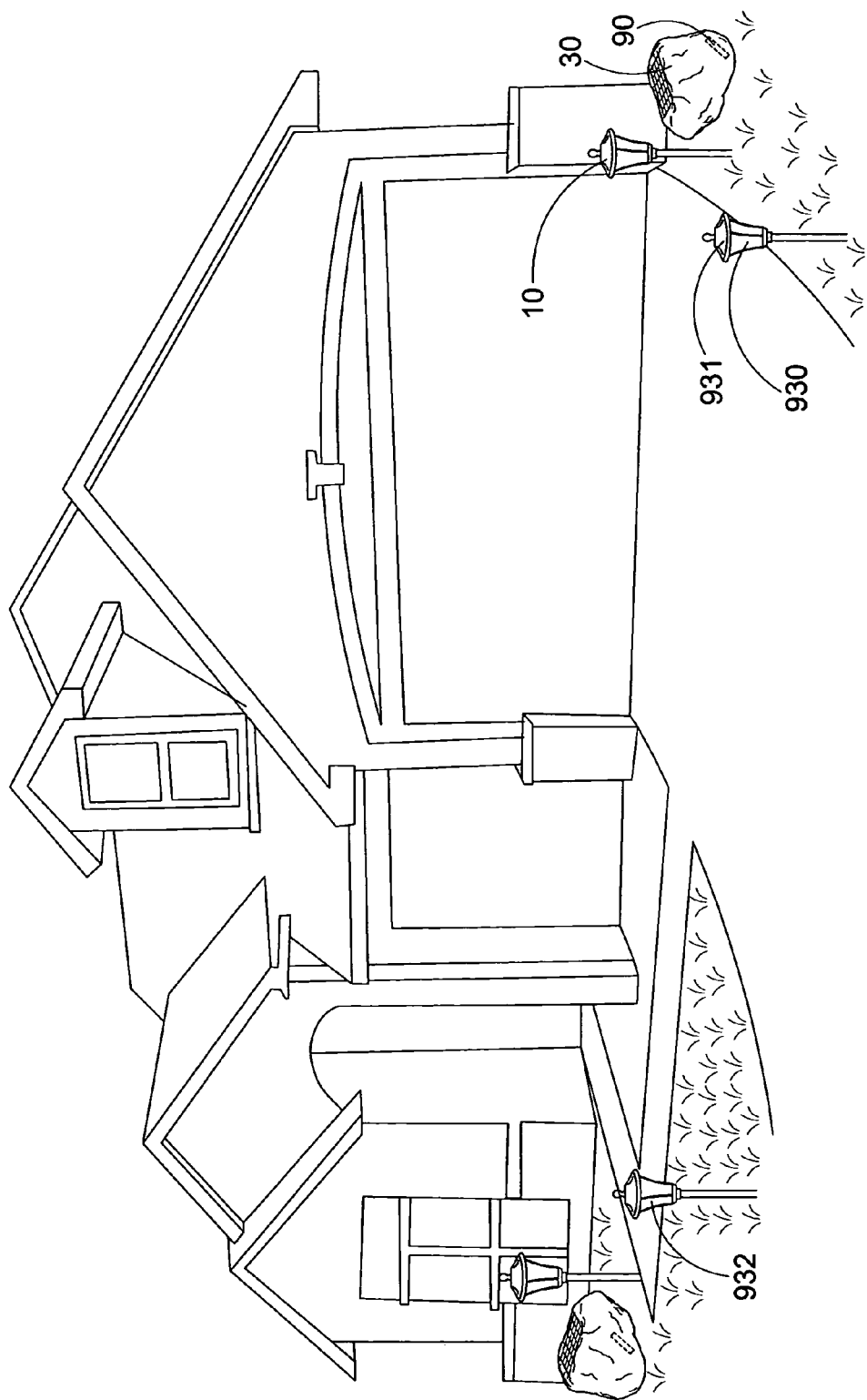
FIG. 15 is another illustration of the solar lighting system according to the above preferred embodiment of the present invention.
Figure 16:
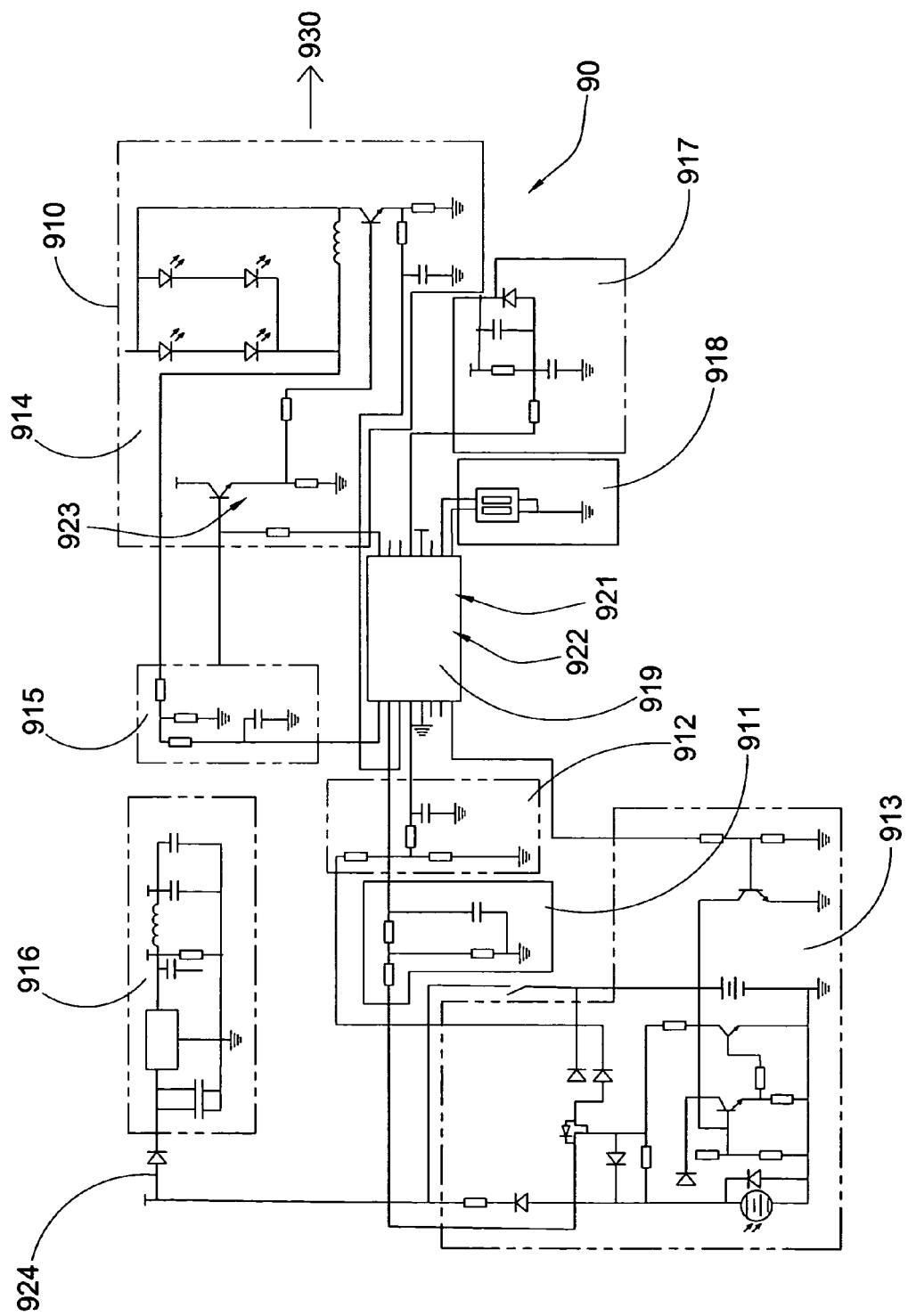
FIG. 16 is an illustration of control circuit of the solar lighting system according to the above preferred embodiment of the present invention.

Referring to FIGS. 15 and 16 of the drawings, a LED light control arrangement 90 arranged for effectively controlling the power consumption of the light emitting unit 101 according to the preferred embodiment of the present invention is illustrated. In particular, the solar lighting system is a LED lighting system 930 and the LED light control arrangement 90 is a control circuit 910 which comprises a light control circuit 911, a battery voltage detection circuit 912, a charge control circuit 913, a PWM constant current control circuit 914, a LED short circuit control circuit 915, a built-in multi-level control circuit 921, a watchdog circuit 922, a MCU 919 for PWM and AD conversion, a MCU power supply circuit 916 and a MCU reset circuit 917. The input terminals of the light control circuit 911 and the battery voltage detection circuit 912 are connected to the output terminals of the charge control circuit 913 respectively. The output terminals of the light control circuit 911 and the battery voltage detection circuit 912 are connected to input terminals of the MCU power supply circuit 916 through a port PA2 and a port PA0 of the MCU power supply circuit 916. The PWM constant current control circuit 914 includes a PWM constant current driver circuit 923 and has an output terminal connected to a series LED lighting system 930 such as the solar lighting system of the present invention, wherein an input terminal of the PWM constant current driver circuit 923 is connected to PWM output terminal through a port 9PA4 of the MCU 919. The series LED lighting system 930 includes a plurality sets of LED light 931 in which one set of the plurality sets of LED light is connected to a port PA1 of the MCU 919. In other words, the lighting apparatus 10 is connected to a port PA1 of the MCU 919 through the wire arrangement 50. The LED short circuit control circuit 915 is connected between the PWM constant current control circuit 914 and a port PA3 of the input terminal of the MCU 919. The MCU reset circuit 917 is controlled by the watchdog circuit 922.

Preferably, as shown in FIG. 16 of the drawings, the control circuit 910 according to a first embodiment of the preferred embodiment of the present invention comprises a D3 diode 924 provided and connected to the MCU power supply circuit 916 to provide protection against reverse connection between the positive and the negative terminals at a position between the charge control circuit 913 and the MCU power supply circuit 916.

Preferably, as shown in FIG. 16 of the drawings, the control circuit 910 according to a second embodiment of the preferred embodiment of the present invention has a preset chip voltage of the light control circuit 911 which is divided through two resistance unit R14 and R23, which is then inputted into a port 9PA2 of the MCU 919 and is compared through a AD digital conversion circuit in the MCU 9 to control a turn on and a turn off action to the LED lighting system 930.

Preferably, as shown in FIG. 16 of the drawings, the control circuit 910 according to a third embodiment of the preferred embodiment of the present invention further comprises a DIP switch 918 provided and connected to a port PB3 and a port PB4 of the MCU 919. Preferably, the MCU 919 is a 46R065 series MCU.

The light control circuit 911 is arranged for controlling on/off status of the LED lighting system 930 through detecting a voltage of solar panel. The voltage of the solar panel is divided by the R23 and R14, inputted into the MCU 919 through port PA2, and transformed into the required data by the MCU 919. The data is then analyzed and compared with a preset database so as to determine whether it is required to turn on or turn off the LED light. This construction can effectively prevent transient occurrence of light flashing due to change of lighting status of the LED light. In addition, if the LED light is turned on, the LED light will not be turned off even a light source which is below 80 LUX is shined onto the LED light. Accordingly, this function can effectively avoid some incidence such as unwanted change of lighting status of the LED light by vehicle headlight.

The control circuit 910 can also realized a time control function in which multi-level time control of a magnitude of current for the LED can be set based on the user's requirement. For example, a small current is arranged for the LED at night when most people go to bed so as to fit the actual user's requirement, and hence dramatically reduce the cost of the LED light. The brightness control is arranged as follows: the light control circuit 911 detects a night-time condition and adjust the LED to a first-level magnitude while the MCU 919 is initiated to a first-level time setting. Then, when the time for the first-level magnitude is reached, a second-level magnitude is started and the MCU 919 is initiated to a second-level time setting. Accordingly, multi-level time setting for multi-level magnitude is achieved.

When the weather is poor for a few days, existing solar LED lights will encounter the problems of insufficient solar energy source and will not be turned on or will only turn on for a short period of time such as 1 to 2 hours. However, through the control circuit 910 of the present invention, the LED can continuously at its on status for 8 hours even if it rains for 3 to 5 days. In particular, a down-flow control is arranged through the control circuit 910. When the battery voltage detection circuit 912 detects that the voltage of the battery is lowered then the default value of the LED light VF, the internal transformation function of PWM and AD of the MCU 919 is employed to automatically decrease the current for LED light. When the voltage is higher than the VF value, then the current is adjusted to a normal level. If there is more than 3 rainy days, because the battery charging voltage cannot reach the PWM constant current discharge status, the MCU 919 will then control the LED from using pulsation to a stable current. Then, the discharge current of the LED is lowered in response to the lowered level of battery voltage in a linear manner and the LED light will then turn off when the discharge current reaches 30% of a normal level to a over-discharge protection status. If the next day is a sunny day and when the battery voltage is charged to reach the PWM discharge status, then a normal discharge current is resulted. If the next day is a rainy day, a limited level of discharge current is maintained.

The PWM constant current control circuit 914: If the battery voltage is greater than the VF value of the LED light, the PWM and AD conversion function of the MCU 919 can control a constant current flow for LED light. The volt-ampere characteristic of LED and regular diode are similar in which when the current flow is greater than the VF value, a very small changes in voltage will have a great effect on the current. Therefore, the present invention utilizes a constant discharge current to ensure the reliability and functionality of the LED light. The PWM constant current discharge further provides an efficiency greater than 90% through the utilizing the feature of discharge characteristic of battery, that is: 80% of discharge of a 12V battery is occurred between 12.3V~12.6V. When the LED light system includes 4 LED light units, the discharge is 250 mA, then the VF is about 2.9V.2.9V*4=11.6V, then 12.6V−11.6V=1V, therefore efficiency=(1−1/12.6)*100%=92%. The process of PWM constant current discharge: the PA4 of the MCU 919 outputs a PWM signal to PWM constant current control circuit 914 to drive the LED light units. The PA1 port of the 9 AD chip samples the current of the LED and converts into numerical value which is then compared to the preset values in the database so as to adjust the mark-space ratio of the PWM output signal and realize the LED constant current control.

The charge control circuit 913 is affected by the voltage and current of the chip. If the battery voltage is very low, such as from 8V of 12V is discharged, the battery can also be charged. When the light source level is greater, the output current is greater, and the driving current obtained by the charge control circuit 913 is greater, thereby minimizing damage to Q5 power tube and increase charging efficiency. When the MCU 919 detects the battery voltage at a level greater than a preset value, such as when a 12V battery with a 14.5V voltage, the MCU 919 will output a shut-off charging loop for high charging. When the MCU 919 detects the battery voltage at a level smaller than a preset value, such as when a 12V battery with a 13.5V voltage, the MCU 919 will output a low voltage to initiate the charge control circuit 913, and will sequentially recycled for five times before completely shutting off the charging loop, and the charge control circuit 913 is reset only in the next day after the LED is discharged at night. Though the main charging loop of the charge control circuit 913 is shut off, an auxiliary loop formed by D13 and R24 is arranged for providing charging at a level which is only 5% of the main loop.

The control arrangement 90 also provides an over-discharge protection, which will directly affect the durability of the battery. Because of the provision of MCU 919, which can sample the battery voltage through AD and automatically convert the voltage into data for analysis, thereby the threshold of over-discharge can be determined. Preferably, the threshold value is set at a level which is 10% higher than the standard preset value. For example, a 12V battery usually has standard preset value of 10V and the threshold value is set at 11V. Because a battery under a slightly over-discharge condition will has a longer lifespan, therefore this slight higher threshold value can prolong the lifespan by 20 to 30%. The process of over-discharge protection is further illustrated as follows: the MCU 919 will shut off the LED discharge current, shut off the LED light and enter into a sleeping condition if the MCU detects that the battery voltage is lowered than the threshold value through the battery voltage detection circuit 912. Accordingly, unnecessary wear and tear is avoided. The MCU reset circuit 917 is arranged for resetting the discharging process.

LED short circuit protection: if the PA3 pin of the MCU 919 detects a short circuit of LED continuously for 0.2 second, the MCU 919 will shut off the LED circuit. The LED discharge circuit will be connected if the MCU 919 detects that the LED is no longer under the short circuit condition.

Protection against reverse connection between the positive and the negative terminals employs the property of one-way conductivity of LED and diode. In particular, the D3 diode is added in the input terminal of three-terminal regulator 78L05 to provide protection against reverse connection between the positive and the negative terminals. Because the power supply to the LED and the regulator are independent, and the power consumption of the regulator is relatively small, which is usually less than 10 mA, the addition of a diode can provide a protective effect while not affecting the overall efficiency.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A solar lighting apparatus, comprising
a light emitting unit for providing illumination and a lighting apparatus body supporting said light emitting unit;
a solar energy arrangement arranged for providing power supply to said light emitting unit, comprising a solar panel unit at a predetermined position for light absorption; and
a mounting arrangement which comprises a mounting plate; at least one ground supporting unit coupling with said mounting plate arranged for securing the mounting plate onto a ground surface; and a light apparatus connecting unit provided through said mounting plate arranged for connecting to said lighting apparatus such that said lighting apparatus is firmly positioned onto the ground through said mounting arrangement, wherein said lighting apparatus is capable of being mounting onto a hard or a soft floor surface,
a LED light control arrangement electrically connected to said light emitting unit and said solar panel unit for effectively controlling a power consumption of said light emitting unit, wherein said LED light control arrangement comprises a light control circuit, a battery voltage detection circuit, a charge control circuit, a PWM constant current control circuit, a LED short circuit control circuit, a built-in multi-level control circuit, a watchdog circuit, a MCU for PWM and AD conversion, a MCU power supply circuit and a MCU reset circuit electrically connected for forming said LED light control arrangement such that said light emitting unit is arranged for being charged and discharged in a controlled manner and is protected against short circuit and overcharging.

2. The solar lighting apparatus, as recited in claim 1, wherein said mounting plate has four coupling holes spacedly provided on said mounting plate, said ground supporting unit comprises four supporting members having a cross-section area fitting and matching said four coupling holes such that said four supporting members are capable of being hammered or inserted onto the ground through penetrating said four coupling holes and anchored through said mounting plate to securely mounting into position, wherein said mounting arrangement is capable of providing sufficient support for standing said lighting apparatus onto the ground.

3. The solar lighting apparatus, as recited in claim 1, wherein said light emitting unit is a light emitting diode unit.

4. The solar lighting apparatus, as recited in claim 2, wherein said light emitting unit is a light emitting diode unit.

5. The solar lighting apparatus, as recited in claim 4, wherein said light apparatus body comprises a head unit supporting said light emitting unit; and a support unit having a first end connecting to said head unit and a second end arranged for positioning onto a ground surface through said mounting arrangement.

6. The solar lighting apparatus, as recited in claim 5, wherein said solar panel unit has a solar panel surface provided on said solar panel unit, and said solar panel unit is positioned on said head unit of said light apparatus body in such a manner that said solar panel surface is exposed outwardly for light absorption.

7. The solar lighting apparatus, as recited in claim 5, wherein said solar panel unit has a solar panel surface provided on said solar panel unit, and said solar panel unit is positioned on said support unit of said light apparatus body in such a manner that said solar panel surface is exposed outwardly for light absorption.

8. The solar lighting apparatus, as recited in claim 5, wherein said light apparatus body has a street lamp construction having a predetermined height and weight which is supported through said mounting arrangement.

9. The solar lighting apparatus, as recited in claim 6, wherein said solar lighting apparatus comprises two light emitting units spacedly provided on and supported by said light apparatus body, wherein said light apparatus body has a street lamp construction having a predetermined height and weight which is supported through said mounting arrangement.

10. The solar lighting apparatus, as recited in claim 9, wherein said solar panel surface is provided between said two light emitting units.

11. The solar lighting apparatus, as recited in claim 5, wherein said head unit of said light apparatus body comprises a top head unit having four top inclined surfaces facing four different direction and a bottom head unit having a supporting base receiving and supporting said light emitting unit and a window allowing light penetration.

12. The solar lighting apparatus, as recited in claim 9, wherein said head unit of said light apparatus body comprises a top head unit having an inverted cup-shaped structure receiving and partially shielding said light emitting unit and a bottom head unit supporting said top head unit in a rotatable and adjustable manner such that said lighting apparatus is capable of providing a spotlight illumination.

13. The solar lighting apparatus, as recited in claim 1, wherein said LED light control arrangement further comprises a diode provided and connected said MCU power supply circuit so as to provide protection against reverse connection between positive and negative terminals at a position between said charge control circuit and said MCU power supply circuit.

* * * * *